United States Patent
Svensson et al.

(10) Patent No.: US 9,545,594 B2
(45) Date of Patent: Jan. 17, 2017

(54) METHOD OF CONTROLLING A GAS CLEANING SYSTEM BY MEASURING A PARAMETER OF AN ABSORBENT MATERIAL

(71) Applicant: ALSTOM Technology Ltd, Baden (CH)

(72) Inventors: Conni Svensson, Alvesta (SE); Peter Hans Odenmo, Växjö (SE)

(73) Assignee: General Electric Technology GmbH, Baden (CH)

(*) Notice: Subject to any disclaimer, the term of this patent is extended or adjusted under 35 U.S.C. 154(b) by 58 days.

(21) Appl. No.: 14/459,697

(22) Filed: Aug. 14, 2014

(65) Prior Publication Data
US 2014/0352530 A1 Dec. 4, 2014

Related U.S. Application Data

(63) Continuation of application No. PCT/IB2013/051786, filed on Mar. 6, 2013.

(30) Foreign Application Priority Data

Mar. 12, 2012 (EP) .................................. 12159041

(51) Int. Cl.
*B01D 53/02* (2006.01)
*B01D 53/14* (2006.01)
(Continued)

(52) U.S. Cl.
CPC ......... *B01D 53/1412* (2013.01); *B01D 53/346* (2013.01); *B01D 53/508* (2013.01);
(Continued)

(58) Field of Classification Search
CPC ................. B01D 2251/404; B01D 2251/602; B01D 2251/604; B01D 2253/102; B01D 2253/1124; B01D 2257/2045; B01D 2257/302; B01D 2258/0291; B01D 53/1412; B01D 53/346; B01D 53/508; B01D 53/685; B01D 53/83
See application file for complete search history.

(56) References Cited

U.S. PATENT DOCUMENTS 5,320,052 A   6/1994   Spokoyny et al.
5,861,053 A * 1/1999   Noritake ............ B01D 53/0407
                                              73/31.06
(Continued)

FOREIGN PATENT DOCUMENTS

CN    201195100 Y    2/2009
EP    0 173 403 A2   3/1986
(Continued)

*Primary Examiner* — Christopher P Jones
(74) *Attorney, Agent, or Firm* — GE Global Patent Operation; Rita D. Vacca (57) ABSTRACT

A gas cleaning system for removing gaseous pollutants from a hot process gas comprises a vessel for bringing the hot process gas into contact with an absorbent material, and a separating device for separating at least a portion of the absorbent material from the hot process gas to form a separated dust material. The gas cleaning system further comprises a measuring device for measuring, directly or indirectly, a dust parameter such as a density, and/or a friction, and/or a hygroscopicity, and/or an electrical property of the separated dust material, to obtain a measurement, and a control system for controlling at least one operating parameter of the gas cleaning system based on the measurement of the measured dust parameter.

9 Claims, 5 Drawing Sheets

(51) Int. Cl.
*B01D 53/34* (2006.01)
*B01D 53/50* (2006.01)
*B01D 53/68* (2006.01)
*B01D 53/83* (2006.01)

(52) U.S. Cl.
CPC ........... *B01D 53/685* (2013.01); *B01D 53/83* (2013.01); *B01D 2251/404* (2013.01); *B01D 2251/602* (2013.01); *B01D 2251/604* (2013.01); *B01D 2253/102* (2013.01); *B01D 2253/1124* (2013.01); *B01D 2257/2045* (2013.01); *B01D 2257/302* (2013.01); *B01D 2258/0291* (2013.01)

(56) References Cited

U.S. PATENT DOCUMENTS

| | | | |
|---|---|---|---|
| 2006/0121616 A1 | 6/2006 | Lefebvre et al. | |
| 2008/0210085 A1* | 9/2008 | Morf | B01D 53/12 95/13 |
| 2010/0104487 A1* | 4/2010 | Smid | B01D 46/34 422/213 |

FOREIGN PATENT DOCUMENTS

| | | |
|---|---|---|
| EP | 0 723 804 A1 | 7/1996 |
| EP | 1 537 905 A1 | 6/2005 |
| EP | 1 815 903 A1 | 8/2007 |
| EP | 1 964 602 A1 | 9/2008 |
| EP | 2 078 555 A1 | 7/2009 |
| JP | 2000 288332 A2 | 10/2000 |
| WO | 95/33547 | 12/1995 |

* cited by examiner

METHOD OF CONTROLLING A GAS CLEANING SYSTEM BY MEASURING A PARAMETER OF AN ABSORBENT MATERIAL

CROSS-REFERENCE TO RELATED APPLICATION

This application claims priority to International Application No. PCT/IB2013/051786 filed on Mar. 6, 2013, which in turn claims priority to EP Application No. 12159041.8 filed on Mar. 12, 2012, both of which are hereby incorporated in their entireties.

FIELD OF THE INVENTION

The present invention relates to a method of controlling a gas cleaning system for removing gaseous pollutants from a hot process gas by bringing the hot process gas into contact with an absorbent material and subsequently separating at least a portion of the absorbent material from the hot process gas thereby forming a separated dust material.

The present invention also relates to a gas cleaning system for removing gaseous pollutants from a hot process gas.

BACKGROUND OF THE INVENTION

In the combustion of a fuel, such as coal, oil, peat, waste, etc., in a combustion plant, such as a power plant or a waste incineration plant, a hot process gas is generated containing among other components, gaseous pollutants, such as hydrogen chloride (HCl) and sulphur oxides, such as sulphur dioxide ($SO_2$). It is normally necessary to remove at least a portion of the gaseous pollutants from the process gas before the process gas can be released into the atmosphere, or treated further in, for example, a carbon dioxide ($CO_2$) compression plant for transport to a $CO_2$-sequestration plant.

When separating gaseous pollutants, such as hydrochloric acid and sulphur dioxide, from hot process gas, a method is frequently used in which a lime-containing absorbent material is introduced into the process gas to react with the gaseous pollutants. When the absorbent material reacts with the gaseous pollutants, the gaseous pollutants are converted chemically or physically into dust material, which is then separated in a filter. EP 1 815 903 A1 discloses an example of such a method, in which lime-containing dust is mixed with water in a mixer and is then introduced into a contact reactor to react with gaseous pollutants of a hot process gas. The dust material formed by such reaction is separated in a filter and recirculated to the mixer to be mixed again with water for subsequent introduction into the contact reactor.

The dust material formed by reaction of absorbent material with gaseous pollutants may contain some substances, such as calcium chloride, prone to making the dust material sticky, which can cause severe operational disturbances in a gas cleaning plant.

SUMMARY OF THE INVENTION

An object of the present invention is to provide a method of controlling a gas cleaning system for efficient operation with limited or no operational disturbances.

This object is achieved by means of a method of controlling a gas cleaning system for removing gaseous pollutants from a hot process gas by bringing the hot process gas into contact with an absorbent material and subsequently separating at least a portion of the absorbent material from the hot process gas thereby forming a separated dust material. The method of control comprises:

measuring, directly or indirectly, at least one dust parameter selected from a group of dust parameters comprising: a density of the separated dust material, a friction of the separated dust material, a hygroscopicity of the separated dust material, and an electrical property of the separated dust material to obtain a measurement, and controlling at least one operating parameter of the gas cleaning system based on the measurement from the measured dust parameter of the separated dust material.

An advantage of this method is that the gas cleaning system may be controlled to operate in an efficient manner with respect to the removal of gaseous pollutants, and/or with respect to the consumption of fresh absorbent, in a manner which causes no or limited operational disturbances.

According to one embodiment, the method further comprises comparing the measurement from the measured dust parameter of the separated dust material to a dust parameter set point, and controlling an operating parameter to effect a change in the dust parameter of the separated dust material when the measurement of the measured dust parameter indicates a risk of the separated dust material causing operational disturbances. An advantage of this embodiment is that the gas cleaning system may be controlled to operate as efficiently as possible while still keeping the operating risks associated with sticky dust material at a relatively low level.

According to another embodiment, the method further comprises comparing the measurement of the measured dust parameter of the separated dust material to a dust parameter set point, and controlling an operating parameter to effect a change in the dust parameter of the separated dust material when the measured dust parameter indicates no risk of the separated dust material causing operational disturbances. An advantage of this embodiment is that the method involves utilization of possibilities of operating the gas cleaning system in a more efficient manner, by controlling the gas cleaning system to operate at a new dust parameter value closer than the presently measured dust parameter value to a value of the dust parameter at which operational disturbances are to be expected.

According to one embodiment, the at least one operating parameter is selected from a group comprising: supply of fresh absorbent to the gas cleaning system, supply of water to the gas cleaning system, degree of recirculating separated dust material to the gas cleaning system, and temperature of the hot process gas inlet to the gas cleaning system. An advantage of these parameters is that they are relatively easy to adjust, and have a relatively large and relatively fast influence on the dust parameter of the separated dust material. Hence, control of one or more of the operating parameters may achieve a relatively large and fast influence on dust material stickiness.

According to one embodiment, the method comprises measuring as a dust parameter of the separated dust material, the density of the separated dust material directly by means of a density meter. An advantage of this embodiment is that a relatively fast and relatively reliable measurement of the separated dust material density can be obtained.

According to another embodiment, the method comprises measuring, as a dust parameter of the separated dust material, the density of the separated dust material and/or the friction of the separated dust material, indirectly by means of measuring an operating parameter of a device handling the separated dust material. An advantage of this embodiment is that a relatively low cost and relatively low maintenance measurement of density and/or friction of the separated dust material can be obtained by analysing operation of a device handling the separated dust material, since no or only limited additional equipment is required. According to a preferred embodiment, the method embodiment further comprises measuring the density and/or the friction of the separated dust material indirectly by means of measuring power drawn by a motor of a device handling the separated dust material. An advantage of this embodiment is that it is relatively easy to accurately measure the motor power draw, and such power draw level has been found to be a reliable indicator of the density and/or friction of the dust material handled using the motor.

According to one embodiment, the method further comprises measuring as the dust parameter an electrical property of the separated dust material selected from a group of electrical properties consisting of conductivity, resistivity, and capacitance. An advantage of this embodiment is that each of the mentioned electrical properties can be measured at a relatively low cost, and has a reliable correlation to the severity of operational disturbances of the gas cleaning system.

According to one embodiment, the method further comprises selecting a set point for the dust parameter of the separated dust material by operating the gas cleaning system at various values of the dust parameter of the separated dust material and evaluating the corresponding operational disturbances. An advantage of this embodiment is that a suitable set point can be determined relatively accurately for a specific gas cleaning system, taking into account the specific conditions under which the specific system operates.

According to one embodiment, the method further comprises measuring the dust parameter of the separated dust material within 30 minutes of separating the dust material from the hot process gas. An advantage of this embodiment is that variations in the operation of the gas cleaning system are quickly registered, such that actions to adjust the dust parameter can be taken before any operating disturbances relating to sticky dust material occurs. Furthermore, measuring the dust parameter quickly after the dust material is separated reduces the risk that the dust parameter measurement may be altered by the storing conditions of the separated dust material.

A further object of the present invention is to provide a gas cleaning system that provides for relatively efficient operation with limited or no operational disturbances.

This object is achieved by means of a gas cleaning system for removing gaseous pollutants from a hot process gas comprising a vessel for bringing the hot process gas into contact with an absorbent material, and a separating device for separating at least a portion of the absorbent material from the hot process gas to form a separated dust material. The gas cleaning system comprises a measuring device for measuring, directly or indirectly, at least one dust parameter selected from a group of dust parameters consisting of a density of the separated dust material, a friction of the separated dust material, a hygroscopicity of the separated dust material, and an electrical property of the separated dust material, to obtain a measurement, and a control system for controlling at least one operating parameter of the gas cleaning system based on the measurement of the measured dust parameter of the separated dust material.

An advantage of this gas cleaning system is that efficient removal of gaseous pollutants may be obtained with no or limited operational disturbances.

According to one embodiment, the gas cleaning system further comprises a motor driving a device handling the separated dust material, the control system adapted for sensing power drawn by the motor to indirectly measure, using the power draw, a dust parameter of the separated dust material, such as a density of the separated dust material, and/or friction of the separated dust material. An advantage of this embodiment is that handling, e.g. mixing or transporting, of the separated dust material and measuring the density and/or the friction, indirectly, of the separated dust material can be obtained using one and the same device, namely the motor.

According to one embodiment, the system comprises a scale for measuring a weight of a sample of a defined volume of the separated dust material to determine as a dust parameter of the separated dust material, the density of the separated dust material. An advantage of this embodiment is that a relatively efficient and yet reliable density measurement can be obtained.

Further objects and features of the present invention will be apparent from the following detailed description and claims.

BRIEF DESCRIPTION OF THE DRAWINGS

The invention is described in more detail below with reference to the appended drawings in which.

DESCRIPTION OF PREFERRED EMBODIMENTS

Figure 1:
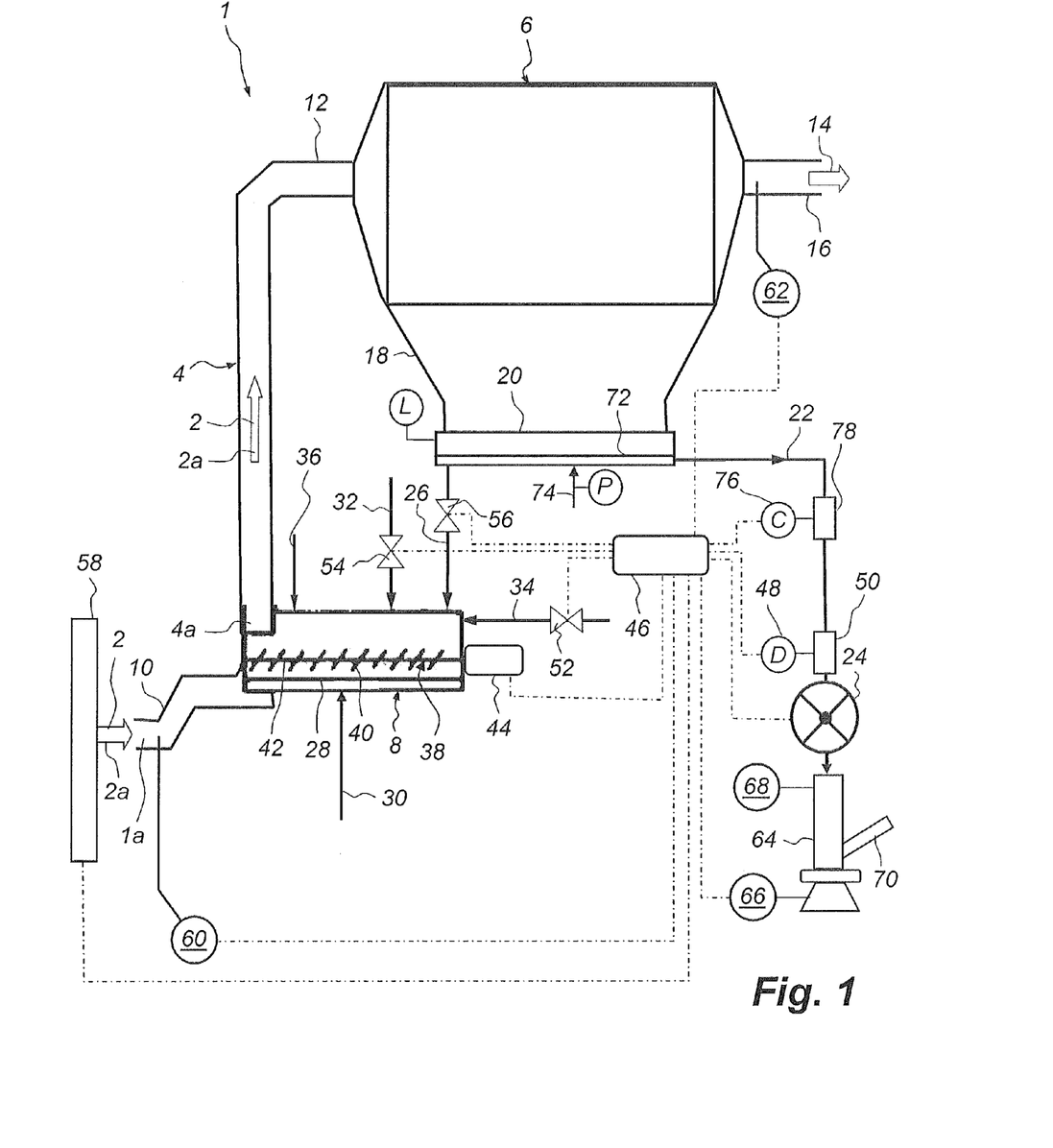
FIG. 1 is a schematic side view and shows a gas cleaning system according to a first embodiment.

FIG. 1 illustrates a gas cleaning system 1. The gas cleaning system 1 is adapted for cleaning a hot process gas 2a in the form of a flue gas 2 formed during, for example, incineration of a waste, such as municipal or industrial waste, in a waste incinerator, not shown, or during combustion of a fuel, such as coal, oil or peat. The flue gas 2 may contain dust, such as fly ash, and gaseous pollutants, such as sulphur dioxide ($SO_2$) and hydrochloric acid (HCl) produced during the incineration or combustion process. The gas cleaning system 1 comprises a contact reactor 4, a dust separator in the form of a fabric filter 6, sometimes referred to as a bag house, and a mixer 8. An example of a fabric filter 6 can be found in U.S. Pat. No. 4,336,035.

The flue gas 2 first passes via a duct 10 to the fluidly connected contact reactor 4. In the contact reactor 4, a particulate absorbent material reactive with the gaseous pollutants of the flue gas 2 is introduced in a moistened state into the flue gas 2. Upon contact with the flue gas 2, the moistened particulate absorbent material converts the gaseous pollutants into a solid material in the form of separable dust. The flue gas 2 and the separable dust flows via fluidly connected duct 12 to the fluidly connected fabric filter 6 where the separable dust is separated from the flue gas 2 to form cleaned flue gas 14 and a separated dust material. The cleaned flue gas 14 leaves the fabric filter 6 via fluidly connected duct 16 and is emitted into the ambient air via a fluidly connected stack, not shown. In accordance with an alternative embodiment, the cleaned flue gas 14 may be forwarded to a $CO_2$-compression plant for compression and subsequent $CO_2$-sequestration.

The fabric filter 6 is provided with a dust hopper 18 for collecting the separated dust material. Via dust hopper 18, the separated dust material reaches a connected common dust storage system 20. A minor portion of the separated dust material separated by fabric filter 6 is discharged as discharge dust from the dust storage system 20 via a fluidly connected pipe 22. The pipe 22 ends in a rotary discharger 24. The rotary discharger 24 feeds the discharge dust into a silo (not shown) for storage or feeds the discharge dust directly to a truck for transportation to e.g. a landfill.

While the minor portion of discharge dust is discharged from the system 1 by means of the rotary discharger 24, the major portion of the separated dust material is fed, via a fluidly connected pipe 26 to the mixer 8. The mixer 8 is provided with a fluidising cloth or net 28. Pressurised air is introduced to the mixer 8 vertically below the cloth 28 via a fluidly connected pipe 30 in order to fluidise the separated dust material in the mixer 8. Water is added to the mixer 8 via a fluidly connected pipe 32 and fresh absorbent, such as burnt lime (CaO) or hydrated lime ($Ca(OH)_2$), is added to the mixer 8 via a fluidly connected pipe 34. The water moistens the separated dust material and slakes any burnt lime (CaO) to form hydrated lime ($Ca(OH)_2$). Further additives, such as activated carbon, may be fed to mixer 8 via a fluidly connected pipe 36. The mixer 8 is provided with an agitator 38 for thoroughly mixing the separated dust material with water, fresh absorbent and any further additives. The agitator 38 may comprise elliptic plates 40 arranged on a revolvable shaft 42. A motor 44 is connected to the revolvable shaft 42 and is arranged for driving agitator 38. A thorough description of a mixer 8 useful in the present invention may be found in WO 97/37747 A1.

The separated dust material, moistened by the water added via the pipe 32, is introduced at the bottom 4a of the contact reactor 4 and is thereby introduced into the flue gases 2 as an absorbent material for absorbing further gaseous pollutants from the flue gases 2. It will be appreciated that the separated dust material is circulated many times in the gas cleaning system 1. The minor portion of discharge dust discharged via the rotary discharger 24 keeps the amount of dust in the system 1 constant. The flue gas 2 contains some fly ash, reaction products are formed continuously in the gas cleaning system 1, and fresh absorbent and additives are added such that there is a continuous addition of dust into the system 1 which is compensated for by the discharge of discharge dust via the discharger 24. Thus the overall amount of dust in the system 1 is rather constant over time.

The system 1 comprises a control system 46 arranged for controlling the operation of the gas cleaning system 1. The control system 46 receives, in accordance with a first embodiment, measurement signals from a density meter 48. The density meter 48 is arranged for measuring a dust parameter, i.e., the density of the separated dust material of the gas cleaning system 1. The density meter 48 may, for example, be a Model DSG Nuclear Density detector, which is available from Ohmart/Vega, Cincinnati, USA. A vertical measuring pipe 50 is arranged upstream with regard to the flow of discharge dust, of the rotary discharger 24. On regular intervals, for example once every 2 to 120 minutes, the control system 46 controls the rotary discharger 24 to cause the rotary discharger 24 to stop discharging discharge dust. The rotary discharger 24 so stops and causes the measuring pipe 50 to be filled with discharge dust. When the measuring pipe 50 is filled with discharge dust, the density meter 48 measures the density, for example in units of $kg/m^3$, of the discharge dust contained in the measuring pipe 50. A signal relaying the measurement information from the measured discharge dust density is sent from the density meter 48 to the control system 46.

The control system 46 compares the measurement measured by the density meter 48 to a set point for the density, to determine whether or not the separated dust material circulating in the gas cleaning system 1 is sticky. If the density measurement is above the set point, then actions may be initiated by control system 46 to reduce the density of separated dust material, to reduce the risk of operational disturbances associated with sticky dust. If the density measurement is below the set point, then actions may be initiated by control system 46 to increase the density of the separated dust material, since a high density dust is often more efficient in removing gaseous pollutants, such as HCl and $SO_2$, from the flue gas 2.

In accordance with a first embodiment, the control system 46 may control the supply amount of fresh absorbent to the mixer 8 via pipe 34. A control valve 52 may be arranged on the pipe 34. If the density measurement of the discharge dust is too high in relation to the set point therefor, then the control system 46 may control the valve 52 to "open" or adjust to a position such that more fresh absorbent is supplied to the mixer 8. An increased supply of fresh absorbent to the mixer 8 via pipe 34 tends to cause a reduction of the density of the separated dust material. On the other hand, if the density measurement is too low in relation to the set point therefor, then the control system 46 may control the valve 52 to "close" or adjust to a position such that less fresh absorbent is supplied to the mixer 8. A reduced supply of fresh absorbent to the mixer 8 via pipe 34 tends to cause an increase of the density of the separated dust material.

In accordance with a second embodiment, the control system 46 may control the supply amount of water via pipe 32 by means of a control valve 54, and/or control the rate of separated dust material recirculation in system 1 by controlling a valve 56 arranged on pipe 26 and by controlling the rotary discharger 24. The amount of water supplied to mixer 8 and the rate of separated dust material recirculation through system 1 influences the separated dust material density. Greater amounts of water supplied to mixer 8 increases the density of the separated dust material, and higher rates of recirculation of separated dust material reduces the density of the separated dust material.

In accordance with a third embodiment, the control system 46 may control the temperature of the flue gas 2 at inlet 1a to the gas cleaning system 1. Such may be accomplished by the control system 46 controlling a boiler 58 arranged upstream with regard to the flow of flue gas 2 through gas cleaning system 1. A higher temperature of the flue gas 2 at inlet 1a results in less water being bound to the circulating separated dust material, and a lower density of the separated dust material. A lower temperature of the flue gas 2 at inlet 1a results in more water being bound to the circulating separated dust material, and a higher density of the separated dust material.

The control system 46 may control one parameter such as supply of fresh absorbent, supply of water, rate of separated dust material recirculation, and temperature of inlet 1*a* flue gas 2, or may control several of those parameters in combination. The parameter(s) suitable and selected for control may also vary. For example, if the concentration of gaseous pollutants of the inlet 1*a* of flue gas 2 is high, then correcting a high density of the separated dust material by increasing the temperature of the inlet 1*a* flue gas 2 is less desirable, since an increased temperature of the inlet 1*a* flue gas 2 tends to reduce system 1 efficiency of removing gaseous pollutants. In such a situation, the control system 46 may, instead of controlling the temperature of the inlet 1*a* flue gas 2, control the supply amount of fresh absorbent via pipe 34 to increase in order to reduce the density of the circulating separated dust material, without reducing the removal efficiency of system 1 with respect to gaseous pollutants. A first gas sensor 60 may be arranged for obtaining a measurement by measuring the concentration of gaseous pollutants, such as HCl and $SO_2$, in the inlet 1*a* flue gas 2, and a second gas sensor 62 may be arranged for obtaining a measurement by measuring the concentration of gaseous pollutants in the cleaned flue gas 14. The control system 46 may receive measurement signals from the first and second gas sensors 60, 62, and may utilize the measurement information received when determining action(s) for controlling the density of the separated dust material.

The density meter 48 may be utilized for directly measuring the density of the separated dust material of the gas cleaning system 1 to obtain a measurement. In accordance with an alternative embodiment, a weighing cylinder 64 may be arranged downstream with regard to flow of discharge dust through pipe 22, of the rotary discharger 24. The weighing cylinder 64 has a specific volume, and is arranged on a scale 66. A level meter 68 is arranged for detecting when the weighing cylinder 64 is full of discharge dust. When "full cylinder" is detected, a signal indicating a weight measurement as measured by scale 66 is sent to control system 46 which determines, based on the volume of cylinder 64 and the weight measurement, the density of the separated dust material. A pneumatic transport system 70 empties the weighing cylinder 64 and forwards the discharge dust to disposal.

In accordance with a yet further embodiment, the control system 46 receives a measurement signal from the motor 44 driving the agitator 38. The signal from the motor 44 indicates a measurement of the power drawn by the motor 44 for driving the agitator 38. The power drawn by the motor 44 is an indirect measure of the density of the separated dust material present in the mixer 8. An increasing power draw by motor 44 correlates to an increasing density of the separated dust material. In this embodiment, the motor 44 will have the function of a measuring device, measuring, indirectly, the density of the separated dust material handled in the mixer 8, to obtain a density measurement. Hence, the control system 46 may, as described hereinbefore, control, based on the density measured indirectly from the power drawn by motor 44, one or more of the parameters regarding supply of fresh absorbent, supply of water, rate of recirculating dust, and temperature of inlet 1*a* flue gas 2. It will be appreciated that measuring the separated dust material density indirectly by measuring the power draw of motor 44 means measuring the density of separated dust material during the mixing of the same with fresh absorbent, water, and any other additives. Using the density meter 48 means, on the other hand, measuring only the separated dust material. As such, measuring the separated dust material density indirectly from the operation of the mixer 8 may provide a feed-back like signal indicating the result of actions taken, such as increasing the supply of fresh absorbent, while measuring the separated dust material density using density meter 48 may provide a feed-forward like signal, indicating the need for actions to correct or adjust the density.

In accordance with another indirect method of measuring the density of the separated dust material, the control system 46 may receive a signal relating to the function of the dust storage system 20. The dust storage system 20 may be a fluidised system comprising a fluidising cloth or net 72. Pressurised air is introduced into dust storage system 20 from vertically below the cloth 72 via a pipe 74 in order to fluidise the dust in the dust storage system 20. A pressure meter P could be arranged in the pipe 74 for measuring the air pressure required for fluidising the separated dust material contained in the dust storage system 20, to obtain an air pressure measurement. The air pressure measurement obtained using meter P could be utilized as an indirect measure of the density of separated dust material of gas cleaning system 1, with a relatively high air pressure measurement correlating to a relatively high separated dust material density. A level meter L could be arranged in the dust storage system 20 to measure and obtain a measurement of the level or amount of fluidized separated dust material therein. The level or amount measured by meter L could be utilized as an indirect measure of the density of separated dust material of gas cleaning system 1, with a relatively low level or amount correlating to a relatively high separated dust material density. Hence, the dust storage system 20 could function as a measuring device, measuring, indirectly, the density of the separated dust material.

In accordance with a further alternative embodiment, the dust parameter measured with respect to the separated dust material is an electrical property of the separated dust material. The electrical property of the separated dust material could be selected from a group of electrical properties consisting of conductivity, resistivity, and capacitance. In one embodiment a capacitance meter 76 is arranged for measuring the capacitance of separated dust material in a vertical measuring pipe 78 arranged upstream with regard to the flow of discharge dust in pipe 22, of the rotary discharger 24. On regular intervals the control system 46 controls the rotary discharger 24 to stop, causing the measuring pipe 78 to fill up with discharge dust. When the measuring pipe 78 is filled with discharge dust, capacitance meter 76 measures the capacitance, for example in the unit Farad, of the discharge dust contained in the measuring pipe 78. A signal containing measurement information as to the measured capacitance is sent from the capacitance meter 76 to the control system 46. One example of a capacitance meter is Agilent U1701A available from Agilent Technologies Inc, Santa Clara, US.

The control system 46 compares the capacitance measurement as measured by the capacitance meter 76 to a set point for the capacitance to determine whether or not the separated dust material circulating in the gas cleaning system 1 is sticky. If there is a risk that the separated dust material circulating in the gas cleaning system 1 is sticky, then measures similar to those described hereinbefore with regard to a density measurement above that of the density set point, may be initiated to decrease the risk of operational problems. If, on the other hand, the separated dust material circulating in the gas cleaning system 1 is at no risk of stickiness, then measures similar to those described hereinbefore with regard to a density measurement below that of the density set point, may be initiated to increase the efficiency of the gas cleaning system 1.

In accordance with an alternative embodiment, the friction of the separated dust material could be measured to obtain a measurement and utilized as the dust parameter based on which the at least one operating parameter of the gas cleaning system 1 is controlled. The friction of the separated dust material indicates how "pasty" the dust is. Hence, the friction measurement is indicative of the risk of operational disturbances. A relatively high friction measurement for the separated dust material indicates an increased risk of operational disturbances compared to a relatively low friction measurement for the separated dust material. There are various ways of measuring the friction of the separated dust material. For example, the friction of the separated dust material could be measured as the internal friction of the separated dust material, and as the wall friction of the separated dust material, both in accordance with, for example, measurement standard ASTM D6773. Furthermore, the friction of the separated dust material could be measured as the powder flowability, in accordance with, for example, measurement standard ASTM D6128. Furthermore, the friction of the separated dust material could also be measured as the viscosity of the fluidized separated dust material in the mixer 8.

Still further, the friction of the separated dust material could be measured indirectly, by measuring the power drawn by a device handling the separated dust material. A separated dust material with a relatively high friction measurement has a relatively large resistance to handling. Hence, the power drawn by, for example, the motor 44 driving the agitator 38 increases with increasing friction of the separated dust material. Hence, the friction of the separated dust material could be measured indirectly by measuring the power drawn by the motor 44, and correlating the power measurement to the friction of the separated dust material. Thus, according to this alternative embodiment, the control system 46 receives a signal from the motor 44 driving the agitator 38, and utilizes such signal conveying the friction measurement of the separated dust material present in the mixer 8, in controlling, based on the indirect friction measurement, one or more of the above-mentioned operating parameters of the gas cleaning system 1. Still further, the friction measurement of the separated dust material could be indirectly measured by measuring the power drawn by the rotary discharger 24, or by measuring the power drawn another device handling the separated dust material.

In accordance with a further alternative embodiment the hygroscopicity of the separated dust material could be measured and utilized as the dust parameter based on which at least one operating parameter of the gas cleaning system 1 is controlled. The hygroscopicity measurement of the separated dust material indicates how prone the separated dust material is to adsorb moisture, and hence, indicates the level of risk of operational disturbances. A relatively high hygroscopicity measurement indicates that the separated dust material is very prone to adsorb moisture and indicates a relatively high risk of operational problems. The hygroscopicity of the separated dust material could be measured by the apparatus HMA available from Waltti Electronics Ltd, Kuopio, Finland. The control system 46 could control one or more of the above mentioned operating parameters based on the hygroscopicity measurement.

It will be appreciated that a combination of direct and indirect methods of density or friction or electrical property measurements could be utilized to increase the accuracy of the separated dust material parameter assessments, and to reduce the risk of separated dust material parameter measurement failure. It is also possible to combine measurements of two or more different separated dust material parameters, such as measurements of density and of an electrical property of the separated dust material, for that same purpose.

Figure 2:
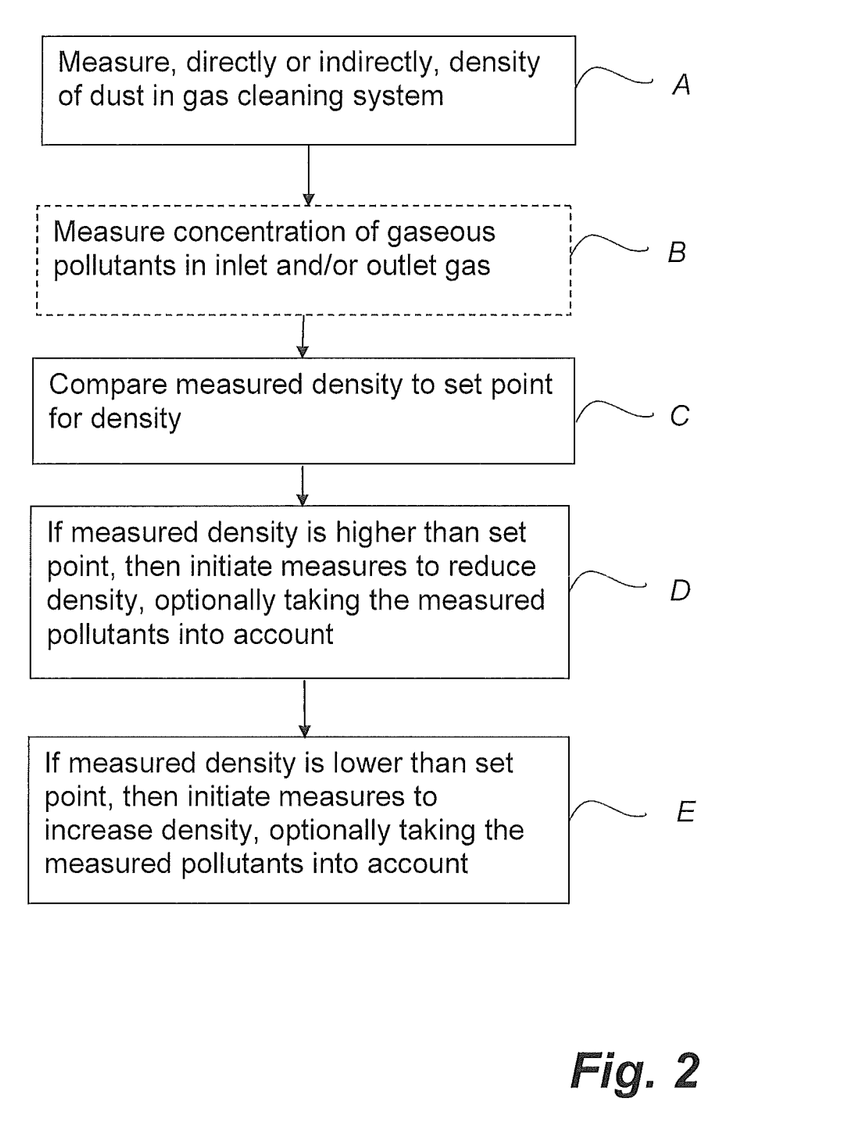
FIG. 2 is a schematic process chart of an embodiment of a method in accordance with the present disclosure.

FIG. 2 is schematic process chart illustrating one embodiment of a method of controlling the operation of the gas cleaning system 1 illustrated in FIG. 1. In the process chart of FIG. 2, reference is given to density measurement, but it will be appreciated that the operation of the gas cleaning system 1 could be based, in a similar manner, on measurement of an electrical property, of friction or of hygroscopicity of the separated dust material.

In a step "A", the density of the separated dust material is measured to obtain a density measurement. Such density measurement could, as described hereinbefore, be direct, using density meter 48, or weighing cylinder 64 and scale 66, or indirect, using signals from motor 44, pressure meter P or level meter L.

In an optional step "B", the concentration of gaseous pollutants, such as HCl and $SO_2$, is measured in the flue gas 2 at inlet 1a, and/or in the cleaned gas 14.

In a step "C", the density measurement of step A is compared to a set point for the density. The density set point corresponds to a density that is preferably not exceeded to avoid operational disturbances related to sticky dust.

In a step "D", actions are initiated if the density measurement is higher than the density set point. Such actions may, as described hereinbefore, include increasing the supply of fresh absorbent, increasing the temperature of the flue gas 2 at inlet 1a, etc. Optionally, the actions are initiated with consideration to the concentration of gaseous pollutants as measured in step B. For example, if it has been concluded in step B that the concentration of gaseous pollutants in the clean gas 14 is close to a limit concentration therefore, then increasing the temperature of the flue gas 2 at inlet 1a may not be a suitable action to implement, at least not taken alone, since an increased flue gas 2 temperature at inlet 1a tends to reduce the removal efficiency of gaseous pollutants. Thus, in such a case, an increased supply of fresh absorbent may be a more suitable action to reduce separated dust material density.

In a step "E", actions are initiated if the density measurement is lower than the density set point. Such actions may, as described hereinbefore, include reducing the supply of fresh absorbent, reducing the temperature of flue gas 2 at inlet 1a, etc. Optionally, the actions are initiated with consideration given to the concentration of gaseous pollutants as measured in step B. For example, if it has been concluded in step B that the concentration of gaseous pollutants in the clean gas 14 is close to a limit concentration therefore, then reducing the temperature of the flue gas 2 at inlet 1a may be a suitable measure, since a reduced temperature tends to increase the removal efficiency of gaseous pollutants. A reduced supply of fresh absorbent may also be a suitable measure, for cost reasons, and may be combined with the reduction in temperature of flue gas 2 at inlet 1a to increase the density of the separated dust material.

Generally, the most efficient manner, with respect to removal efficiency of gaseous pollutants, and operating costs, including the consumption of fresh absorbent, is to operate at high concentrations of chloride ($Cl^-$) in the separated dust material, since chlorides make the separated dust material more efficient in removing gaseous pollutants from the flue gas 2. It has been found that there is a correlation between the concentration of chlorides and the density of the separated dust material.

Figure 3A:
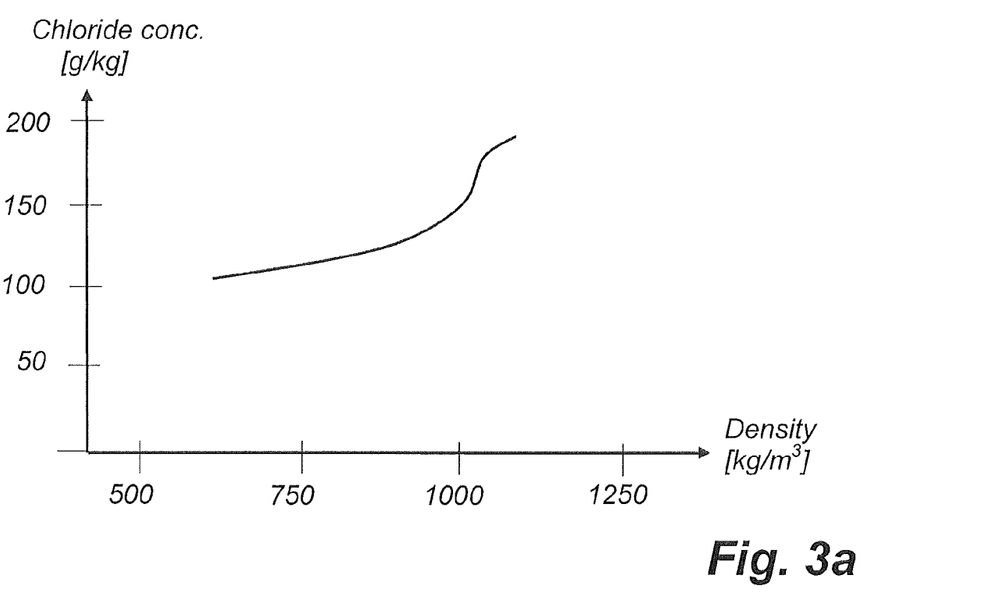
FIG. 3a is a diagram illustrating an example of a correlation between measured chlorides and density.

FIG. 3a is a diagram illustrating an example of a correlation between measured chlorides and density. The Y-axis of the diagram depicts the concentration of chlorides in unit g/kg, in the separated dust material, and the X-axis depicts the corresponding density in unit kg/m³, of the separated dust material. As illustrated, the chloride concentration increases steeply at densities above about 900 kg/m³. It will be appreciated that the correlation between chlorides and density is plant specific, influenced by such factors as amount of fly ash and gaseous pollutants in flue gas, rate of separated dust material recirculation, type and amount of fresh absorbent supplied, etc. Hence, to achieve relatively high efficiency in removing gaseous pollutants, it is beneficial to operate the system 1 at the highest possible density of separated dust material, since a relatively high density of separated dust material comprises a relatively high concentration of chlorides, and results in more efficient gaseous pollutant removal.

Figure 3B:
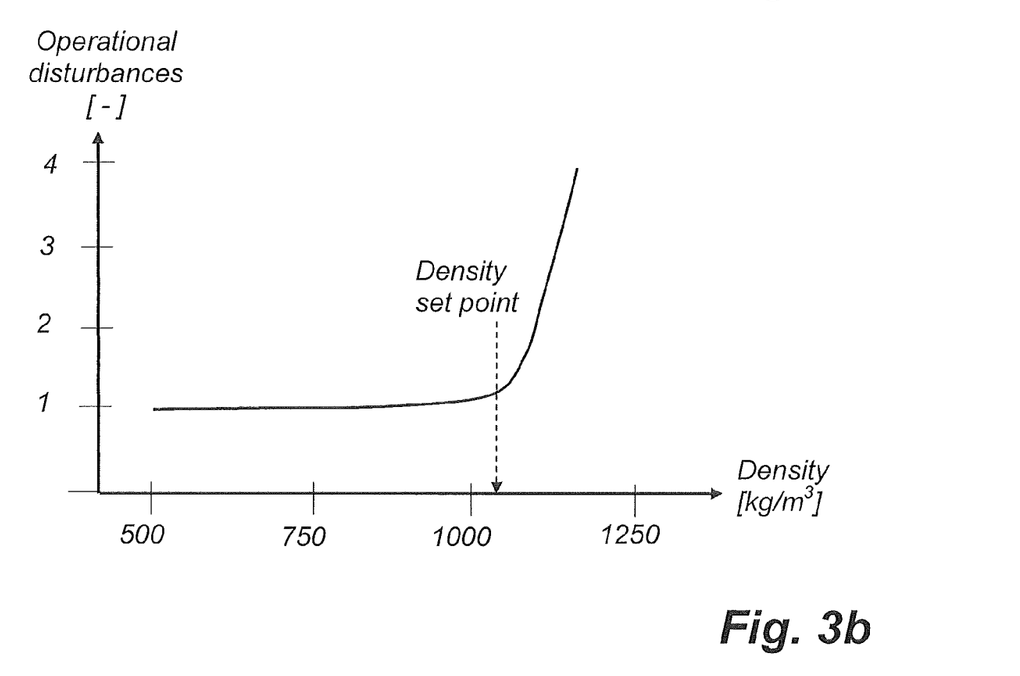
FIG. 3b is a diagram illustrating an example of a correlation between density and estimated operational disturbances.

FIG. 3b is a diagram illustrating an example of a correlation between separated dust material density and estimated operational disturbances in the gas cleaning system 1. The operational disturbances may, for example, start with discordant sounds from the rotary discharger 24 and an increased pressure drop with respect to the flue gas over the fabric filter 6. If the density of the separated dust material is not lowered, the operational disturbances may increase to include dust clogging inside of fabric filter 6, in dust storage system 20, in mixer 8, and in duct 4 and pipes 22, 26 connecting those devices. Such dust clogging within system 1 may require shutting down the plant for maintenance, cleaning and repair, which should be avoided when possible. In FIG. 3b, operational disturbances on the Y-axis have been graded from 1 to 4, where "1" indicates a normal operation of relatively low risk that could continue for months without operational disturbances, and "4" indicates operation of relatively high risk requiring an immediate shut down of the gas cleaning system 1 due to operational disturbances. Grades "2" and "3" indicate operation risk levels intermediate to grades "1" and "4" described above. The X-axis of FIG. 3b depicts the corresponding density of the separated dust material. It will be appreciated that the correlation between operational disturbances and separated dust material density is plant specific influenced by such factors as amount and type of fly ash and gaseous pollutants in flue gas, rate of separated dust material recirculation, type and amount of fresh absorbent supplied, etc. To determine a suitable separated dust material density, empirical testing can be done. Such tests could include increasing the density of the separated dust material stepwise until the first signs of operational disturbances occur, such as for example, discordant sounds from the rotary discharger 24. When discordant sounds from the discharger 24 occur, the separated dust material density is decreased again until the discordant sounds subside. The density of the separated dust material at the point of discordant sound elimination may then be used as a set point density used by the control system 46 to determine if any actions need implementation to increase or decrease the separated dust material density to avoid operational disturbances. In the example depicted in FIG. 3b, the set point for separated dust material density could be selected as 1040 kg/m³. Such separated dust material density would be expected to result in the most efficient operation of system 1 with respect to consumption of fresh absorbent and removal of gaseous pollutants, without causing undesirable operational disturbances.

Figure 4A:
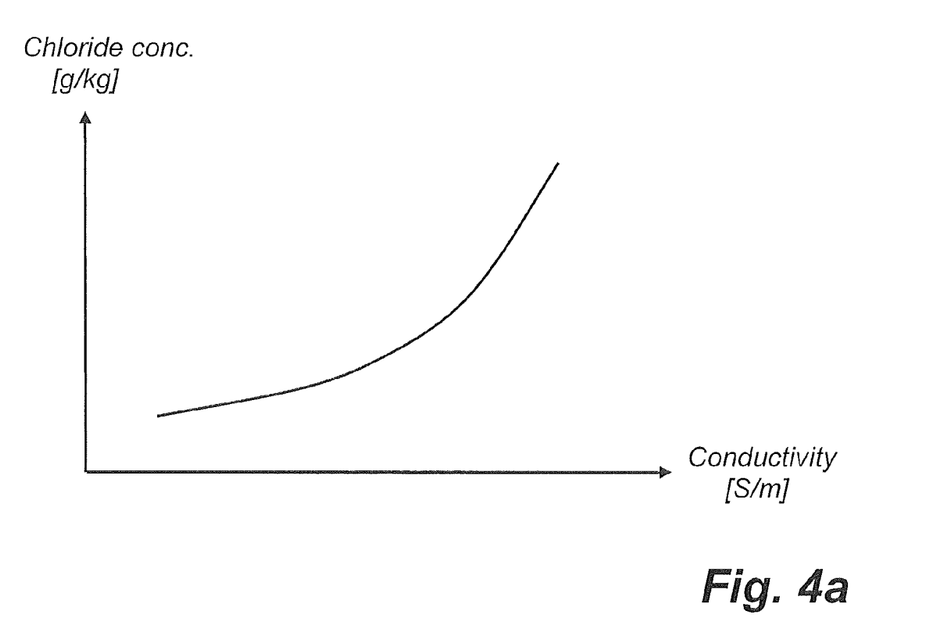
FIG. 4a is a diagram illustrating an example of a correlation between measured chlorides and conductivity.

FIG. 4a is a diagram similar to that of FIG. 3a, that illustrates an example of a correlation between measured chlorides and electrical conductivity. The Y-axis of the diagram depicts the concentration of chlorides in unit g/kg, in the separated dust material, and the X-axis depicts the corresponding electrical conductivity in unit Siemens/m, of the separated dust material. Conductivity data for the diagram of FIG. 4a may be obtained by measuring the electrical conductivity for a number of separated dust material samples of different chloride concentration.

Figure 4B:
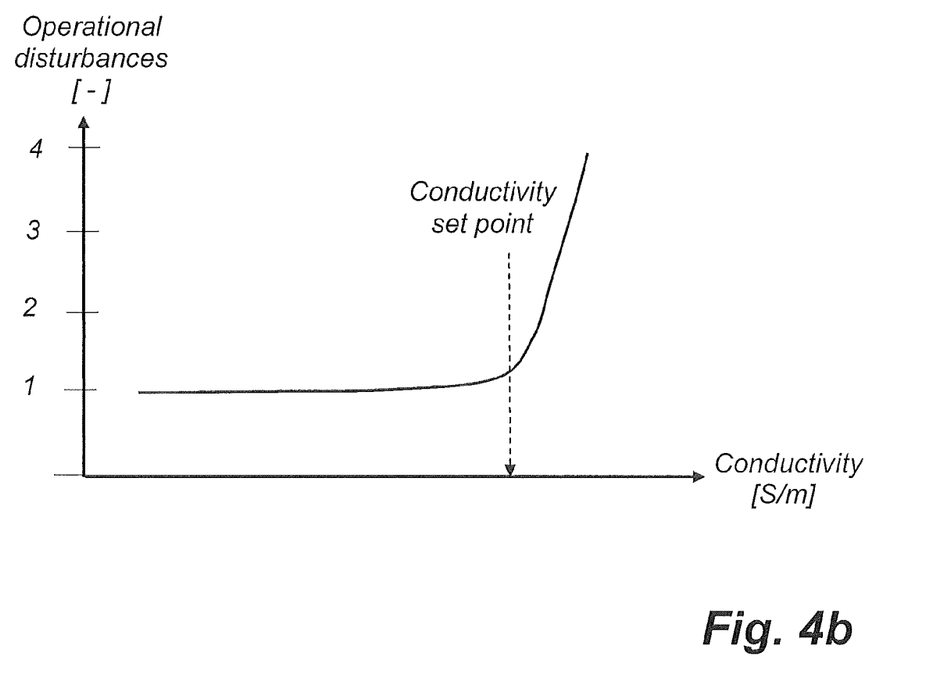
FIG. 4b is a diagram illustrating an example of a correlation between conductivity and estimated operational disturbances.

FIG. 4b is a diagram illustrating an example of a correlation between electrical conductivity and estimated operational disturbances occurring in the gas cleaning system 1. Similar to FIG. 3b, the operational disturbances are graded from 1 to 4, where "1" indicates a normal operation of relatively low risk of operational disturbances, and "4" indicates a state of operation of relatively high risk for operational disturbances requiring an immediate shut down of the gas cleaning system 1. The control system 46 initiates actions to reduce the risk of operational disturbances when the measured electrical conductivity exceeds a conductivity set point.

Figure 5:
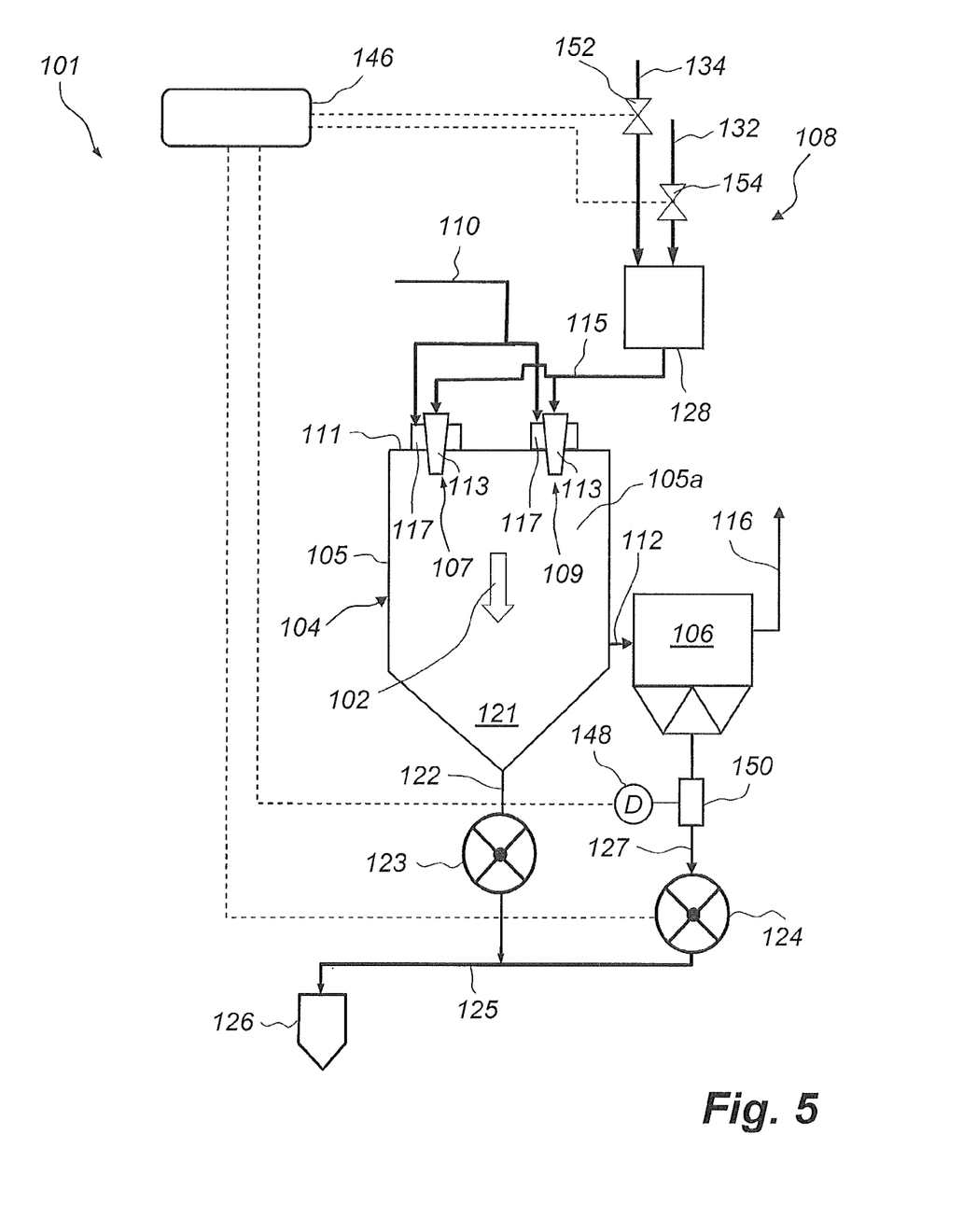
FIG. 5 is a schematic side view of a gas cleaning system according to a second embodiment.

FIG. 5 illustrates a gas cleaning system 101 according to a second embodiment. The gas cleaning system 101 comprises a spray dryer absorber 104, a dust separator in the form of a fabric filter 106, sometimes referred to as a bag house, and a mixing system 108.

Flue gas 102 flows via a fluidly connected duct 110 to the spray dryer absorber 104. The spray dryer absorber 104 comprises a spray dryer chamber 105 and a number of dispersers 107, 109 mounted at a roof 111 of the spray dryer chamber 105. Each disperser 107, 109 comprises an atomizer 113, which may be, for example, a rotary atomizer, an example of which is described in U.S. Pat. No. 4,755,366, or a nozzle, operative for atomizing an absorbent material in the form of an absorption liquid supplied from mixing system 108 via a fluidly connected pipe 115.

Each disperser 107, 109 is provided with a flow directing device 117 operative for mixing an amount of flue gas 102 flowing through fluidly connected duct 110 with absorption liquid atomized by the respective atomizer 113.

The mixture of flue gas 102 and absorption liquid travels downwardly within interior 105a of the spray dryer chamber 105, causing a reaction of gaseous pollutants with absorbent material of the absorption liquid, and evaporation of the water content of the absorption liquid. A dry solid material in the form of separable dust is, as an effect of such reaction and evaporation, formed in interior 105a of the spray dryer chamber 105. The flue gas 102, from which most of the gaseous pollutants have been removed, leaves the spray dryer absorber 104 via a fluidly connected duct 112. The flue gas 102 flows through duct 112 to the fabric filter 106. As an alternative, the fabric filter 106 may be substituted with an electrostatic precipitator or any other suitable filtering device. The fabric filter 106 removes most of the separable dust from the flue gas and forms a separated dust material and a cleaned flue gas. The cleaned flue gas may then be admitted to the ambient air via a fluidly connected clean gas duct 116.

Separable dust collected at a bottom 121 of the spray dryer chamber 105 is a first discharged dust portion discharged from the gas cleaning system 101 via a fluidly connected pipe 122. The pipe 122 is in fluid communication with a first rotary discharger 123, which feeds the first discharged dust portion, via a fluidly connected discharge pipe system 125, into a silo 126 for storing end product, or feeds the discharged dust directly to a truck for transportation to e.g. a landfill. The separated dust material collected in the fabric filter 106 is a second discharge dust portion discharged from the gas cleaning system 101 via a fluidly connected pipe 127. The pipe 127 is in fluid communication with a second rotary discharger 124, which feeds the second discharged dust portion, via the fluidly connected discharge pipe system 125 into the silo 126, or feeds the discharged dust directly to a truck for transportation to e.g. a landfill.

The mixing system 108 comprises a tank 128 for mixing water supplied via a fluidly connected pipe 132 with fresh absorbent, such as burnt lime, (CaO), or hydrated lime, (Ca(OH)$_2$), supplied via a fluidly connected pipe 134. The mixing of water and fresh absorbent in the tank 128 forms the absorption liquid supplied via fluidly connected pipe 115 to the dispersers 107, 109.

The gas cleaning system 101 comprises a control system 146, which receives measurement information in the form of signals from a density meter 148 arranged for measuring the density of the separated dust material collected in the fabric filter 106. The density meter 148 measures the density of separated dust material in a fluidly connected vertical measuring pipe 150 arranged upstream with regard to the flow of dust through pipe 127, of the second rotary discharger 124.

The control system 146 compares the measurement of the separated dust material density as measured by the density meter 148 to a set point for the separated dust material density, to determine whether or not the separated dust material of the gas cleaning system 101 is sticky. If the separated dust material density measurement is above the set point, then actions may be initiated by control system 146 to reduce the separated dust material density, to reduce the risk of operational disturbances associated with sticky dust.

In accordance with a first embodiment, the control system 146 may control the supply level of fresh absorbent to the tank 128 via fluidly connected pipe 134 by controlling a control valve 152. If the measurement for the density of the separated dust material, as measured by density meter 148, is too high as compared to the set point, then the control system 146 may signal adjustment of the valve 152 to allow more fresh absorbent to be supplied to the tank 128. On the other hand, if the measurement for the density of the separated dust material is too low as compared to the set point, then the control system 146 may signal adjustment of the valve 152 to allow less fresh absorbent to be supplied to the tank 128.

In accordance with a second embodiment of controlling the system 101, the control system 146 may control the level of supply of water via fluidly connected pipe 132 to system 101 by means of a control valve 154. The amount of water supplied and the amount of fresh absorbent supplied to system 101 influences the density of the separated dust material, as measured by density meter 148, with greater amounts of water supplied increasing the density of the separated dust material, and greater amounts of fresh absorbent supplied reducing the density of the separated dust material.

According to similar principles as described hereinbefore with respect to the gas cleaning system 1, it is preferable to operate the gas cleaning system 101 with as high separated dust material density as possible, without causing operational disturbances. Hence, control strategies described hereinbefore with reference to FIGS. 1-4 may be utilized also in the gas cleaning system 101. Furthermore, as alternative to measuring using density meter 148 to obtain measurements, other direct and indirect separated dust material density measurement principles, as described hereinbefore with reference to FIG. 1, may be utilized for measuring the density of the separated dust material. According to one embodiment, the level of power supplied to the second rotary discharger 124 for discharging separated dust material from fabric filter 106 via fluidly connected pipe 127 could be measured, and the measurement utilized by the control system 146 as an indirect measure of the density of the separated dust material. Furthermore, a meter for measuring an electrical property, such as conductivity, resistivity, or capacitance, of the separated dust material could be utilized to obtain measurements in combination with or as a replacement to the density meter 148. Still further, the level of power supplied to the second rotary discharger 124 for discharging separated dust material from fabric filter 106 via pipe 127 could be measured, and the measurement utilized by the control system 146 as an indirect measure of the friction of the separated dust material.

It will be appreciated that numerous variants of the embodiments described above are possible within the scope of the appended claims.

Hereinbefore it has been described, with reference to FIG. 1, that the gas cleaning system 1 may comprise a mixer 8 in which a separated dust material is mixed with water to form a moistened dust which is then brought into contact with the hot process gas 2a in a contact reactor 4. Furthermore, it has been described, with reference to FIG. 5, that the gas cleaning system 101 may comprise a mixer 108 in which absorbent material is mixed with water to form an absorption liquid, which is then brought into contact with the hot process gas, such as flue gas 102, in a spray dryer chamber 105. It will be appreciated that the principles of the present method and gas cleaning system may also be applied to other types of gas cleaning systems, in which absorbent material is brought into contact, in a dry, moistened, or liquid form, with a hot process gas 2a, with at least a portion of the absorbent material subsequently separated in a solid form from the hot process gas 2a thereby forming a separated dust material. An example of one such other type of gas cleaning system is described in U.S. Pat. No. 4,795,566 disclosing a method in which fresh absorbent material and recirculated material are mixed, in a dry state, with hot process gases.

Hereinbefore it has been described that the electrical property meter could be a capacitance meter 76. It will be appreciated that it is also possible to utilize a conductivity meter or resistivity meter for measuring an electrical property and obtaining a measurement relevant to the conditions of the separated dust material.

Hereinbefore it has been described that the control system 46, 146 initiates measuring an operating parameter of a device handling the separated dust material, for example a level of power consumption of a mixer 8 motor 44 or a level of power consumption of a discharger 24, 124, and utilizes the measurement obtained for indirectly measuring the density and/or the friction of the separated dust material. The level of power consumed by a device handling the separated dust material is an indication of the resistance of the separated dust material handled. Such resistance may correlate to the separated dust material density, and may also correlate to the separated dust material friction. Depending on the composition of the separated dust material, the correlation between the measured level of power consumption and the density and/or friction of the separated dust material may be more or less strong. Hence, for some separated dust material compositions the measured level of power consumption may have a strong correlation to the separated dust material density, but a less strong correlation to the separated dust material friction, and for other compositions of separated dust material, the situation may be the opposite. For some types of separated dust material, the measured level of power consumption may have a strong correlation to both the density and the friction of the separated dust material. A skilled person can by routine experimentation determine for a specific separated dust material composition, if the level of power consumed by a device handling the separated dust material correlates in a suitable useful manner to the density and/or the friction of the separated dust material.

To summarize, a gas cleaning system 1 for removing gaseous pollutants from a hot process gas 2a comprises a vessel 4 for bringing the hot process gas 2a into contact with an absorbent material, and a separating device 6 for separating at least a portion of the absorbent material from the hot process gas 2a to form a separated dust material. The gas cleaning system 1 further comprises a measuring device 48, 20, 44, 76 for measuring, directly or indirectly, a dust parameter such as a density, and/or a friction, and/or a hygroscopicity, and/or an electrical property of the separated dust material, and a control system 46 for controlling at least one operating parameter of the gas cleaning system 1 based on a measurement of the measured dust parameter.

While the invention has been described with reference to a number of preferred embodiments, it will be understood by those skilled in the art that various changes may be made and equivalents may be substituted for elements thereof without departing from the scope of the present invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of controlling a gas cleaning system comprising:
    removing gaseous pollutants from a hot process gas by bringing the hot process gas into contact with an absorbent material;
    separating at least a portion of the absorbent material from the hot process gas thereby forming a separated dust material;
    measuring, directly or indirectly, at least one dust parameter of density, friction, hygroscopicity, or electrical property of the separated dust material, to obtain a density, friction, hygroscopicity or electrical property measurement; and
    controlling at least one operating parameter of the gas cleaning system based on the density, friction, hygroscopicity or electrical property measurement of the separated dust material.

2. A method according to claim 1, further comprising:
    comparing the density, friction, hygroscopicity or electrical property measurement of the separated dust material to a dust parameter set point to obtain a comparison; and
    controlling the at least one operating parameter to effect a change in the at least one dust parameter of the separated dust material when the comparison indicates a risk of the separated dust material causing operational disturbances.

3. A method according to claim 1, further comprising:
    comparing the density, friction, hygroscopicity or electrical property measurement of the separated dust material to a dust parameter set point to obtain a comparison; and
    controlling the at least one operating parameter to effect a change in the dust parameter of the separated dust material when the comparison indicates no risk of the separated dust material causing operational disturbances.

4. A method according to claim 1, wherein the at least one operating parameter is selected from a group consisting of supply of fresh absorbent to the gas cleaning system, supply of water to the gas cleaning system, rate of recirculating separated dust material to the gas cleaning system, and temperature of the hot process gas at an inlet to the gas cleaning system.

5. A method according to claim 1, further comprising:
    measuring, as the at least one dust parameter of the separated dust material, the density of the separated dust material directly by means of a density meter to obtain a density measurement.

6. A method according to claim 1, further comprising:
    measuring, as the at least one dust parameter of the separated dust material, the density of the separated dust material, and/or the friction of the separated dust material, indirectly by means of measuring an operating parameter of a device handling the separated dust material, to obtain a density and/or friction measurement.

7. A method according to claim 1, further comprising:
    measuring, as the at least one dust parameter of the separated dust material, the density and/or the friction of the separated dust material indirectly by means of measuring a level of power drawn by a motor of a device handling the separated dust material, to obtain a density and/or friction measurement.

8. A method according to claim 1, further comprising:
    measuring, as the at least one dust parameter, an electrical property of the separated dust material selected from a group of electrical properties consisting of conductivity, resistivity, and capacitance, to obtain an electrical property measurement.

9. A method according to claim 1, further comprising:
    selecting a set point for the at least one dust parameter of the separated dust material by operating the gas cleaning system at various dust parameter values of the separated dust material, and evaluating the corresponding operational disturbances.

* * * * *

UNITED STATES PATENT AND TRADEMARK OFFICE
CERTIFICATE OF CORRECTION

PATENT NO. : 9,545,594 B2
APPLICATION NO. : 14/459697
DATED : January 17, 2017
INVENTOR(S) : Svensson et al.

It is certified that error appears in the above-identified patent and that said Letters Patent is hereby corrected as shown below:

On the Title Page

Item (56), under "U.S. PATENT DOCUMENTS", in Column 2, Line 2, delete "Noritake" and insert -- Noritake et al. --, therefor.

On Page 2, item (56), under "U.S. PATENT DOCUMENTS", in Column 1, Line 4, delete "Smid" and insert -- Smid et al. --, therefor.

In the Specification

In Column 14, Line 26, delete "mixer 108" and insert -- mixer 8 --, therefor.

Signed and Sealed this
Tenth Day of April, 2018

Andrei Iancu
*Director of the United States Patent and Trademark Office*